United States Patent [19]

Lombard et al.

[11] Patent Number: 6,065,393
[45] Date of Patent: May 23, 2000

[54] APPARATUS FOR COOKING A PLURALITY OF ARTICLES

[75] Inventors: Jacobus Frederik Lombard, 530 Opstal Street, Die Wilgers, 0041; Christoffel Antonie Lombard, both of Pretoria, South Africa

[73] Assignee: Jacobus Frederik Lombard, Pretoria, South Africa

[21] Appl. No.: 09/202,956

[22] PCT Filed: Jun. 25, 1997

[86] PCT No.: PCT/GB97/01694

§ 371 Date: Mar. 19, 1999

§ 102(e) Date: Mar. 19, 1999

[87] PCT Pub. No.: WO97/49321

PCT Pub. Date: Dec. 31, 1997

[30] Foreign Application Priority Data

Jun. 25, 1996 [ZA] South Africa .......................... 96/5370

[51] Int. Cl.[7] ..................................................... A47J 37/10
[52] U.S. Cl. .................................. 99/427; 99/426; 99/448
[58] Field of Search ............................. 99/426, 428, 440, 99/448, 418, 416, 427; 249/119, 120, 203

[56] References Cited

U.S. PATENT DOCUMENTS

| 1,350,651 | 8/1920 | Hirst | 99/446 |
| 3,911,806 | 10/1975 | Thomison | 99/418 |
| 4,488,479 | 12/1984 | Sloan et al. | 99/345 |

FOREIGN PATENT DOCUMENTS

| 527 628 | 10/1921 | France . |
| 2 113 080 | 9/1972 | Germany . |

*Primary Examiner*—Reginald L. Alexander
*Attorney, Agent, or Firm*—Burns, Doane, Swecker & Mathis, L.L.P.

[57] ABSTRACT

Apparatus is provided for use in cooking a number of separate articles such as eggs. In one embodiment of the apparatus, internal walls (14) extend radially between inner (12) and outer (10) circular walls, defining separate compartments (18). In other embodiments, individual cooking rings (34, 58, 68, 102, 106) are attachable releasably to a central holder (40, 48, 60, 74, 84), and can move relative to the holder so that the apparatus can be used on a curved cooking surface.

9 Claims, 5 Drawing Sheets

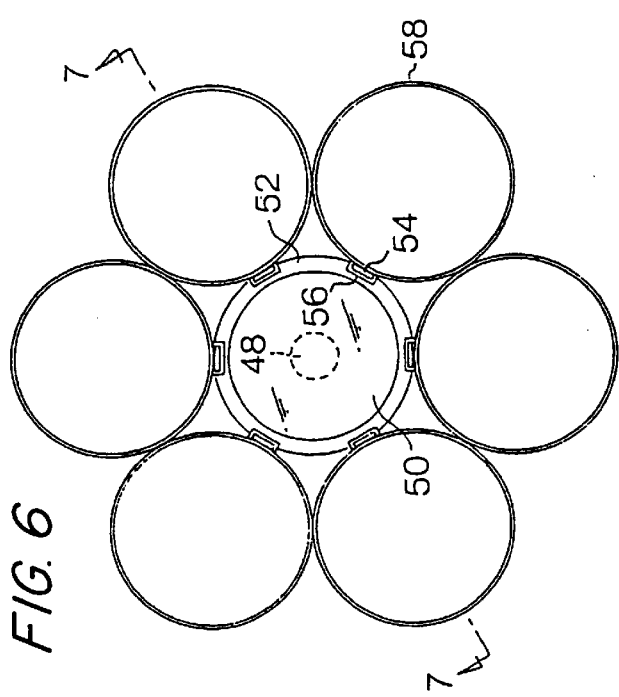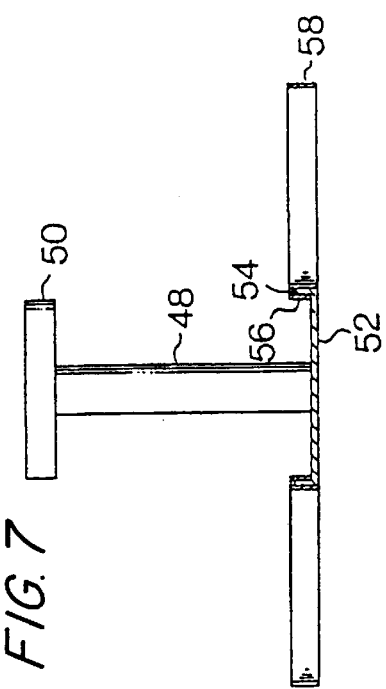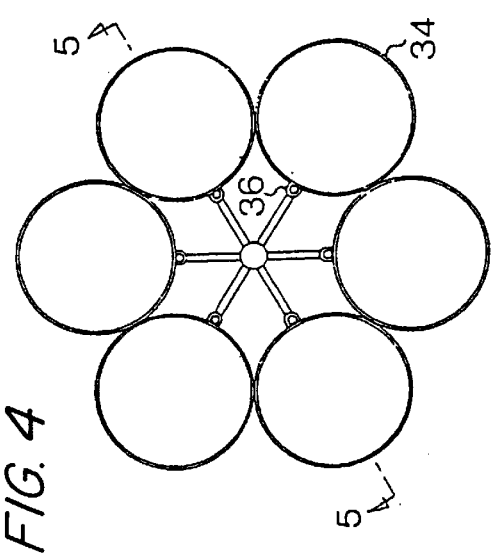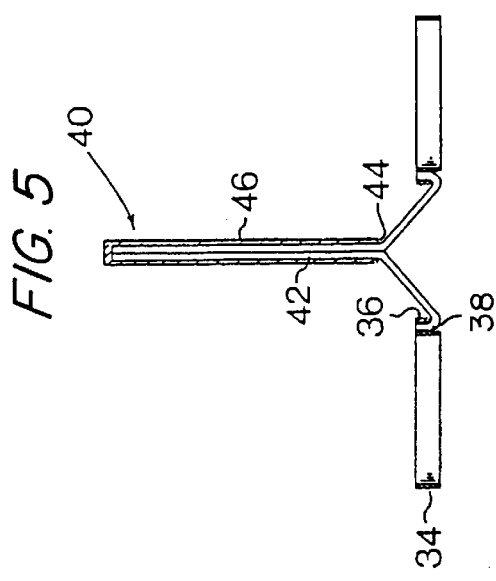

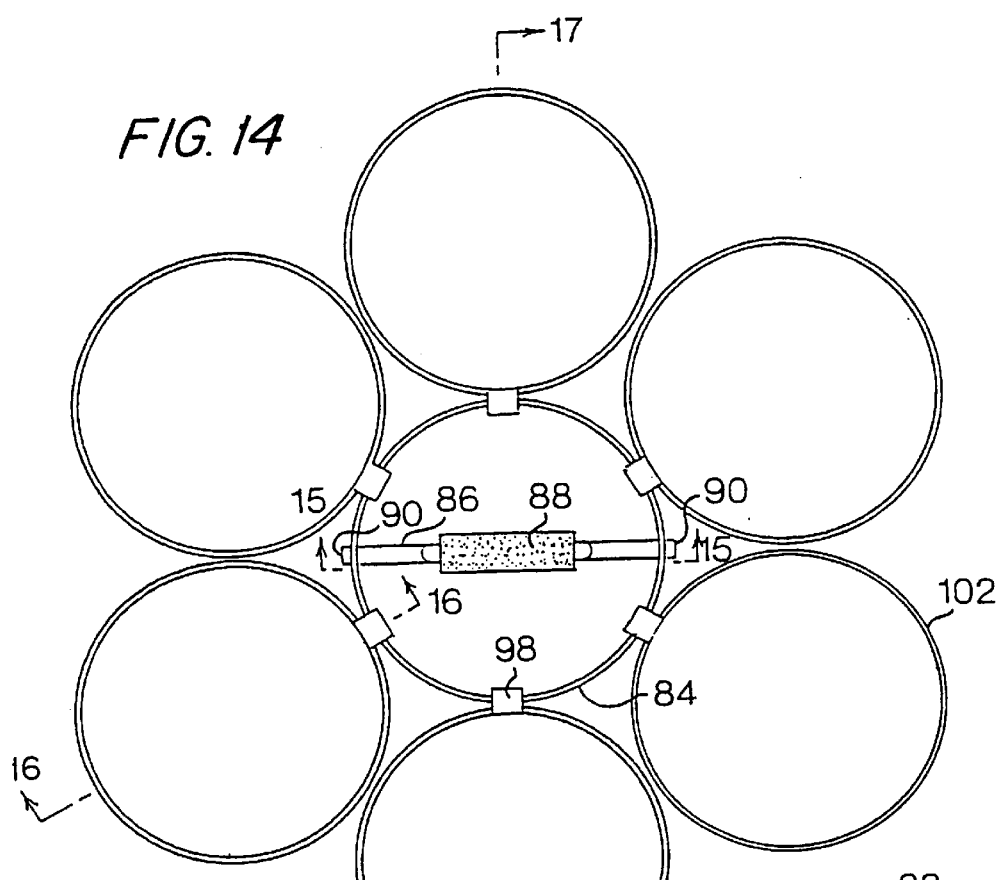
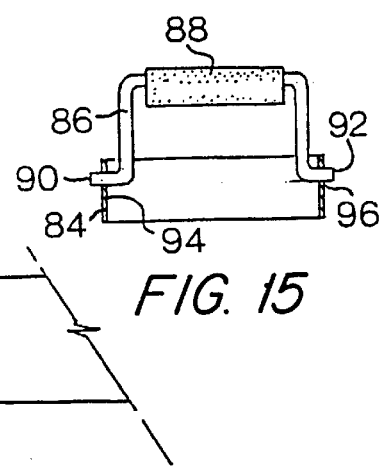
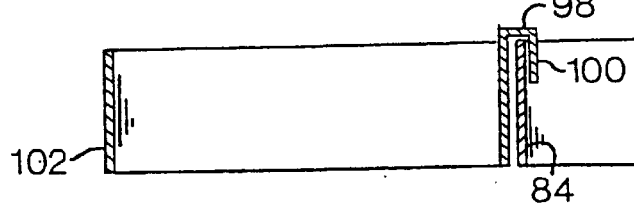
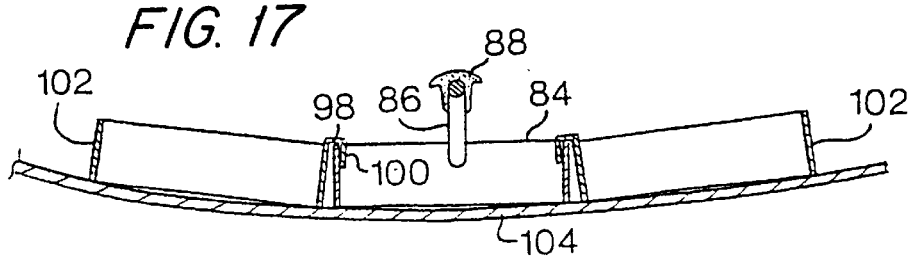

APPARATUS FOR COOKING A PLURALITY OF ARTICLES

BACKGROUND OF THE INVENTION

THIS invention relates to apparatus for use in cooking a plurality of articles on a heated surface.

When a number of articles such as eggs must be cooked on a heated surface, such as a hot plate or a frying pan, it is difficult to maintain the articles separate on the heated surface. Eggs, in particular, tend to join together, requiring them to be cut apart for serving or flipping thereof.

It is an object of the invention to provide apparatus which can be used for cooking multiple articles.

SUMMARY OF THE INVENTION

According to a first aspect of the invention there is provided apparatus for use in cooking a plurality of articles on a heated surface, the apparatus comprising:

an upstanding peripheral wall;

a plurality of upstanding internal walls extending inwardly of the peripheral wall and defining a plurality of compartments for receiving respective articles to be cooked and maintaining them separate on the heated surface; and a handle connected movably to the peripheral wall and movable between an erect position in which it extends transversely from a plane defined by the peripheral wall, and a collapsed position adjacent to the peripheral wall.

The peripheral wall is preferably substantially circular, the internal walls extending radially inwardly therefrom.

The apparatus may include an upstanding endless innermost wall defining a central compartment, the internal walls extending radially between the peripheral wall and the innermost wall.

The handle may be curved and be pivoted at respective ends to opposed brackets on the peripheral wall.

According to a second aspect of the invention there is provided apparatus for cooking a plurality of articles on a heated surface, the apparatus comprising:

handle means defining at least one support formation;

a plurality of cooking ring members each defining a compartment for receiving an article to be cooked and for maintaining the articles separate on the heated surface; and attachment means on each cooking ring member for attaching the cooking ring member releasably to said at least one support formation on the handle means.

The cooking ring members preferably comprise a strip of material formed in a circular or other endless shape.

The handle means may comprise an upright elongate handle member with a plurality of hooks disposed radially outwardly thereof at one end of the member.

The ring members may be formed with eyes or openings at an edge thereof which are engagable releasibly with the hooks on the handle member.

Alternatively, the handle means may comprise a holding ring member to which the cooking ring members are releasably attachable, and a handle extending substantially diametrally across the holding ring member.

A plurality of slots may be formed in the periphery of the holding ring member, and each cooking ring member is provided with an outwardly extending tab having an enlarged head, the tab being engagable with a respective slot.

In another embodiment, a plurality of tubular retaining formations are provided on the periphery of the holding ring member, each cooking ring member being provided with a hook on the periphery thereof which is slidably engagable with a respective tubular retaining formation.

In a further embodiment, each cooking ring member is provided with a folded tab engagable with an upper edge of the periphery of the holding ring member.

The cooking rings, when engaged with the holding ring, are preferably moveable relative to the holding ring so that each cooking ring can rest substantially flat on a curved cooking surface.

BRIEF DESCRIPTION OF THE DRAWINGS

FIG. 4 is a plan view of a second embodiment of apparatus according to the invention;

FIG. 5 is a partial sectional side view on the line 5—5 in FIG. 4;

FIG. 6 is a plan view of a third embodiment of the invention similar to the embodiment of FIGS. 4 and 5;

FIG. 7 is a partial sectional side view on the line 7—7 in FIG. 6;

FIG. 14 is a plan view of a sixth embodiment of the invention;

FIG. 15 is a partial sectional side view, on a reduced scale, on the line 15—15 in FIG. 13, FIG. 16 is a section on the line 16—16 in FIG. 13; and FIG. 17 is a section on the line 17—17 in FIG. 13, showing the apparatus of FIG. 13 in use on a curved cooking surface.

DESCRIPTION OF EMBODIMENTS

Figure 1:
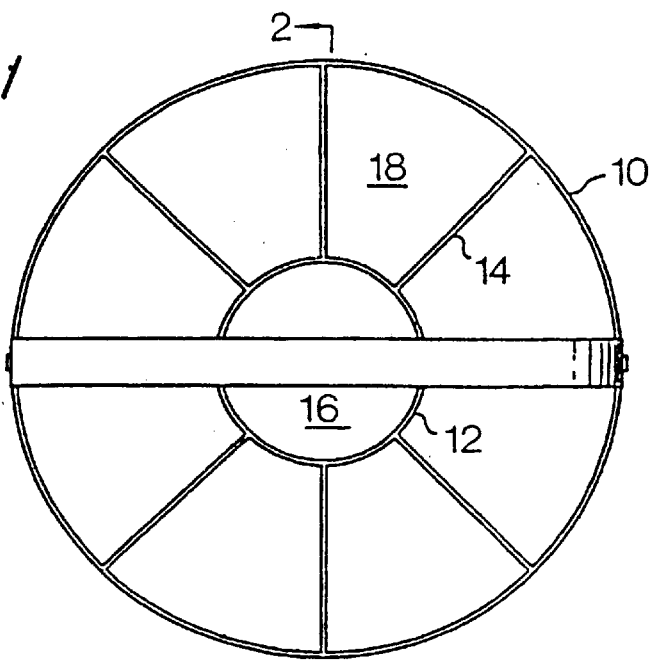
FIG. 1 is a plan view of a first embodiment of apparatus according to the invention.
Figure 2:
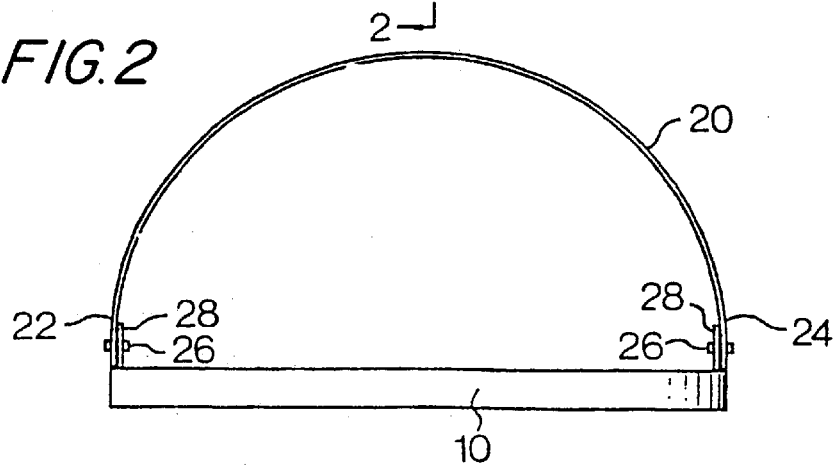
FIG. 2 is a side view of the apparatus.
Figure 3:
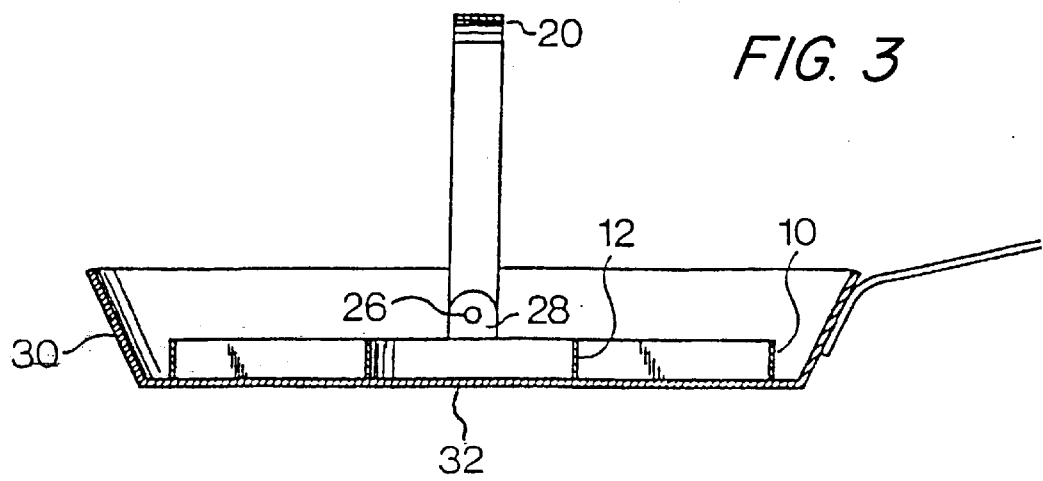
FIG. 3 is a sectional view on the line 2—2 in FIG. 1, showing the apparatus in a frying pan.

Referring first to FIGS. 1 to 3, a first embodiment of apparatus according to the invention for cooking a plurality of articles is shown. The apparatus comprises an upstanding, circular peripheral wall 10, an upstanding circular inner wall 12 which is concentric with the wall 10, and a plurality of straight, upstanding internal walls 14 which extend radially between the peripheral wall 10 and the inner wall 12.

The inner wall 12 defines a circular, central compartment 16, while the internal walls 14 define a plurality of truncated sector-shaped compartments 18 between the peripheral wall 10 and the inner wall 12. The length of the inner wall 12 and the lengths of the internal walls 14 are selected so that the compartment 16 and the compartments 18 have approximately equal areas.

A curved handle 20 is provided which has respective ends 22 and 24 which are connected pivotally by means of rivets 26 to respective (28) mounted 180° apart on the peripheral wall 10. The radius of curvature of the handle 20 is substantially the same as that of the wall 10, so that the handle 20 can be moved between the erect position illustrated in the drawings, through 90° to a collapsed position in which it lies adjacent the peripheral wall.

The walls 10, 12 and 14 are conveniently formed from strips of stainless steel which can be spot welded together to fabricate the apparatus. The height of the walls will depend on the intended application of the apparatus, but a height of approximately 1 cm is suitable for cooking eggs. Instead of stainless steel, the apparatus can be formed from another suitable material, such as a plastics material, which is able to withstand the heat of cooking.

FIG. 3 shows the apparatus in position in a frying pan 30. The apparatus is seen to have an overall diameter which is slightly less than that of the base 32 of the frying pan.

FIGS. 4 and 5 show a second embodiment of the invention. In this version, a plurality of separate ring members 34 are provided, each comprising an endless, upstanding wall. In the illustrated embodiment, the ring members 34 are circular in plan, but can have any other desired shape suitable for enclosing an egg or another article to be cooked. Each ring member 34 has an eye 36 formed on its outer surface which is shaped to receive a hook 38 of a handle 40. In the illustrated embodiment, the handle 40 is formed from six lengths of stiff wire 42 which are bent radially outwardly at the lower end 44 of the handle and which terminate in upwardly directed hooks 48. The wires 42 are held together by a tubular sleeve 46.

The ring members 34 are easily lifted off the hooks 36 for cleaning, and only the required number of ring members need be attached to the hooks of the handle 40 when the apparatus is used. The eyes 36 are made with an internal diameter slightly greater than that of the hooks 38, so that there is a degree of play between the eyes and the hooks. This allows the apparatus to compensate for a cooking surface which is not entirely flat, or which is dished or otherwise curved, with each ring member being able to adopt a slightly different attitude if necessary, while remaining seated substantially flat on the surface.

FIGS. 6 and 7 show a variation of the embodiment of FIGS. 4 and 5. This embodiment also has a central, upstanding handle 48 with a disc-shaped member 50 at the top thereof, to facilitate grasping of the handle. The handle has a disc-shaped base portion 52 at its lower end which is formed with a plurality of integral, upstanding tabs 54 which are received in rectangular eyes 56 formed on the outer periphery of the ring members 58.

Figure 8:
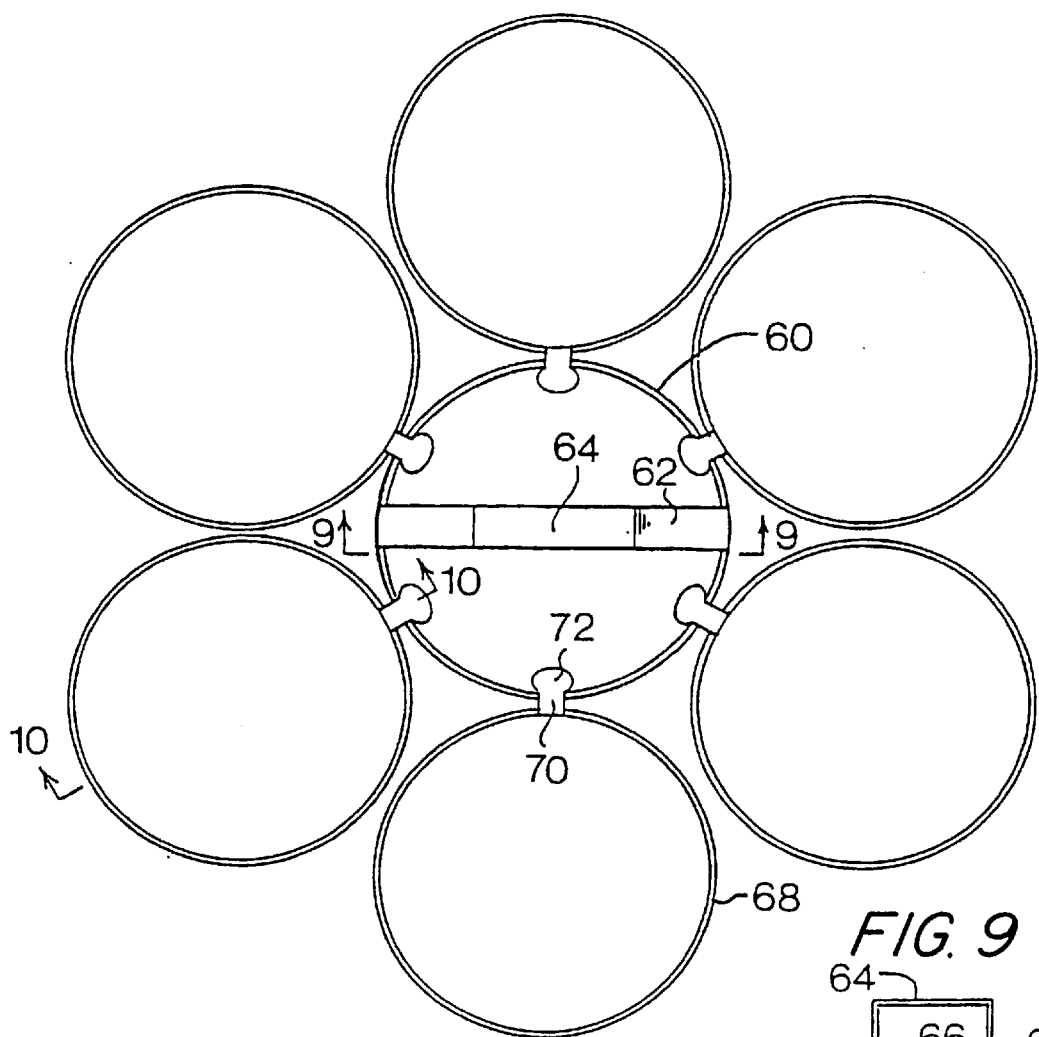
FIG. 8 is a plan view of a fourth embodiment of the invention.
Figure 9:
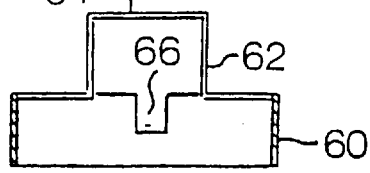
FIG. 9 is a partial sectional side view (on a reduced scale) on the line 9—9 in FIG. 8.
Figure 10:
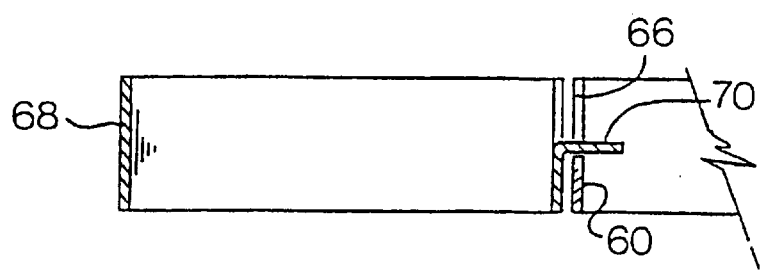
FIG. 10 is a section on the line 10—10 in FIG. 8.

A fourth embodiment of the invention is shown in FIGS. 8, 9 and 10. In this embodiment, a central ring-shaped holder member 60 is provided, which is formed from sheet metal and which has a diametrally extending handle 62 with a raised central portion 64 to allow lifting of the apparatus. At equispaced intervals around the periphery of the ring 60 are rectangular slots 66 which have a length approximately half the height of the ring 60.

Six separate cooking ring members 68 are provided, each of which has an outwardly extending tab 70 with an enlarged head 72 formed thereon, for example, by being cut out of the material of the ring 68 and being bent outwardly. The neck of each tab 70 is sized to fit within the slots 66, while the head 72 of the tab is sufficiently large that it cannot be withdrawn through the slot in use.

Thus, it can be seen that if the holding ring 60 is lifted by the handle 64, the cooking rings 68 will be lifted with it, hanging from the holding ring by their respective tabs. The individual cooking rings can be removed from the holding ring by simply lifting them relative to the holding ring. It will be appreciated that the relative sizes of the slots 66 and the tabs 70 can be adjusted so that the tabs fit into the slot with a degree of play, thus allowing the cooking rings to move relative to the holding ring. This allows the apparatus to be used on a curved cooking surface if desired, such as a dished cooking plate or wok.

Figure 11:
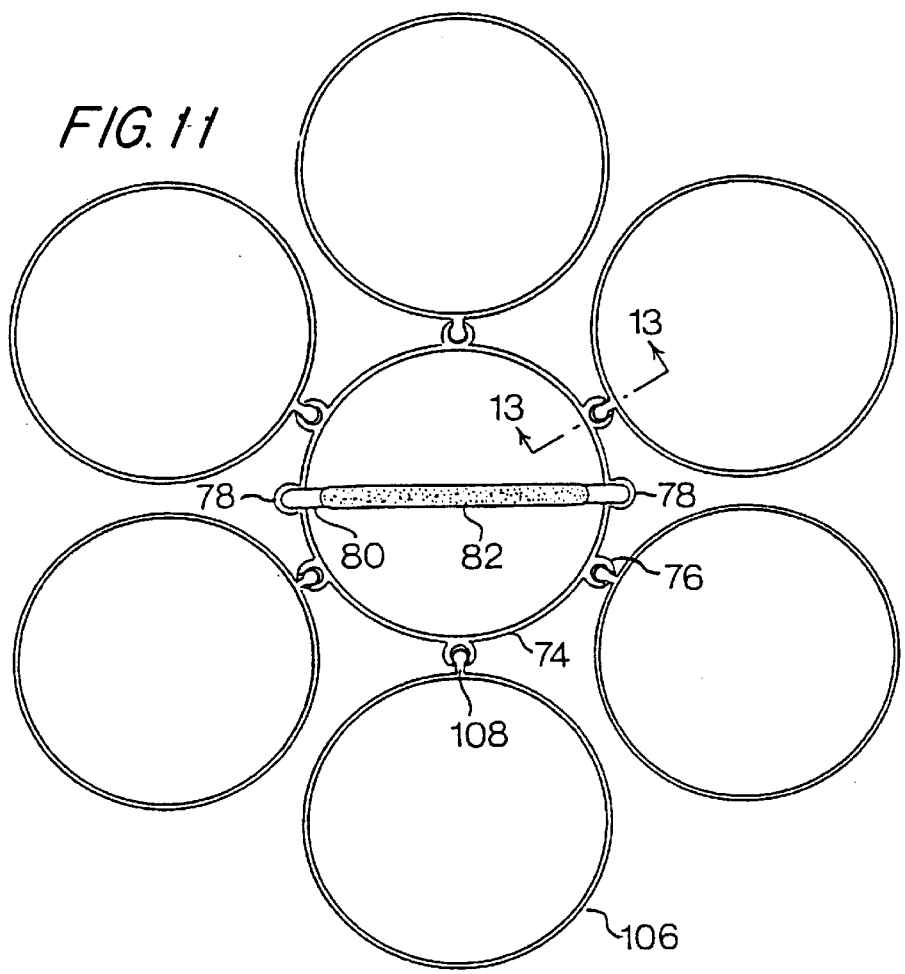
FIG. 11 is a plan view of a fifth embodiment of the invention.
Figure 12:
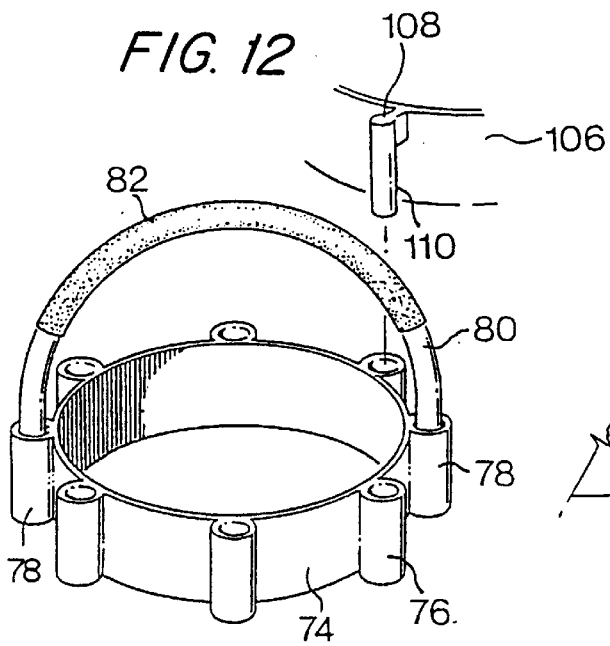
FIG. 12 is a pictorial view of a holding ring of this embodiment, showing how it engages an associated cooking ring.
Figure 13:
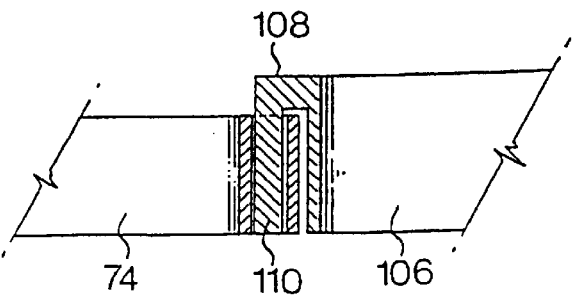
FIG. 13 is a section on the ine 13—13 in FIG. 11.

FIGS. 11 to 13 show a fifth embodiment of the invention. In this embodiment, the central holding ring 74 is provided with six equispaced sleeves or tubes 76 on its outer surface which are oriented upright as best seen in FIG. 12. A pair of additional sleeves or tubes 78, which are diametrically disposed and which are located between adjacent sleeves 76 on opposite sides of the ring 74, serve as locating sockets for a generally semi-circular handle 80. As best seen in FIG. 12, the handle 80 comprises a length of cylindrical wire, the ends of which are a tight fit in the respective sockets 78. A layer of thermally insulating plastics material 82 is provided on the central portion of the handle 80.

Six cooking rings 106 are provided, each of which has a hook formation 108 extending outwardly from its periphery. Each hook formation has a downwardly extending spigot shaped portion 110 which is a rattle fit in a respective tube or sleeve 76 (see FIG. 13), so that there is a degree of play between the hooks and their respective sleeves. This permits relative movement between the cooking rings 106 and the holding ring 74.

This embodiment of the invention is conveniently formed from extruded metal, such as an aluminium alloy. The holding rings 74 and the cooking rings 106 are then cut from respective extrusions. In the case of the cooking rings 106, a cut is made in the neck portion of the formation corresponding to the hook 108, to define an opening between the depending portion 110 of the hook and the ring 106 itself.

Finally, FIGS. 13 to 16 show a sixth embodiment of the invention. In this embodiment, a central holding ring 84 is provided with a handle 86 having a central gripping portion 88 of a thermally insulating material. The opposed ends 90 and 92 of the handle 86 are fitted through respective apertures 94 and 96 in the holding ring 84, allowing pivoting of the handle in use.

In this embodiment, folded tabs 98 with a downwardly extending portion 100 are formed on the upper edge of each of a number of cooking rings 102, allowing these rings simply to be hooked over the upper edge of the holding ring 84, as best seen in FIG. 15.

The length of the tab 98 is sufficient that there is a clearance between the downwardly extending portion 100 thereof and the ring 102 which is greater than the thickness of the ring 84 so that relative movement of the cooking rings 102 and the holding ring 84 is possible. The effect of this is illustrated in FIG. 16, where the apparatus is shown in use on a curved cooking surface 104. The relative movement between the rings allows each ring to be seated on the cooking surface with a minimum of clearance, thus reducing any tendency for eggs or other articles to leak out between the rings and the cooking surface. Thus, the apparatus is useful both for cooking multiple articles, such as eggs, separately, but also for preventing mixing or intermingling of different articles or substances when cooking them on the same cooking surface.

All of the above described versions of the apparatus of the invention are relatively simple and robust, and can be used in a conventional frying pan or on other generally flat heated cooking surfaces. The embodiments in which a plurality of individual ring members are provided can, in addition, be used on curved cooking surfaces and can also be used separately if desired, or in the required number. In this regard, a smaller holding ring can be provided which supports, say, four cooking rings instead of six, for use where fewer articles (or fewer different articles) are to be cooked.

The central holding ring of the cooking apparatus (or, in the case of the first embodiment, the central compartment 16) can conveniently have a small quantity of water or other liquid (typically 5–10 ml) placed therein, which will boil as the articles in the cooking rings or outer compartments of the apparatus cook. If a lid is placed over the pan or cooking surface while this occurs, steam from the boiling liquid will circulate over the articles being cooked helping to cook their upper surfaces. This is useful when, for example, cooking a number of eggs, allowing the upper surfaces of the eggs to set and cook to a desired degree without it being necessary to over cook them from the under side.

We claim:

1. Apparatus for cooking a plurality of articles on a heated surface, the apparatus comprising:

handle means defining at least one support formation;

a plurality of cooking ring members each defining a compartment for receiving an article to be cooked and for maintaining the articles separate on the heated surface; and attachment means on each cooking ring member for attaching the cooking ring member releasably to a respective support formation on the handle means so that the cooking rings, when engaged with the handle means, are moveable relative to the handle means so that each cooking ring can rest substantially flat on a curved cooking surface.

2. Apparatus according to claim 1 wherein each cooking ring member comprises a strip of material formed in a circular or other endless shape.

3. Apparatus according to claim 1 wherein the handle means comprises an elongate upright handle member with a plurality of hooks disposed radially outwardly thereof at one end of the member.

4. Apparatus according to claim 3 wherein the cooking ring members are formed with eyes or openings at an edge thereof which are engagable releasably with the hooks on the handle member.

5. Apparatus according to claim 1 wherein the handle means comprises a holding ring member to which the cooking ring members are releasably attachable, and a handle extending substantially diametrally across the holding ring member.

6. Apparatus according to claim 5 wherein a plurality of slots are formed in the periphery of the holding ring member, and each cooking ring member is provided with an outwardly extending tab having an enlarged head, the tab being engagable with a respective slot.

7. Apparatus according to claim 5 wherein a plurality of tubular retaining formations are provided on the periphery of the holding ring member, each cooking ring member being provided with a hook on the periphery thereof which is slidably engagable with a respective tubular retaining formation.

8. Apparatus according to claim 7 wherein a pair of auxiliary tubular retaining formations are provided at opposed positions on the holding ring member, and a handle member is provided, with respective ends thereof being received in the tubular retaining formations.

9. Apparatus according to claim 5 wherein each cooking ring member is provided with a folded tab engagable with an upper edge of the periphery of the holding ring member.

* * * * *